(12) United States Patent
Igarashi et al.

(10) Patent No.: US 7,528,902 B2
(45) Date of Patent: May 5, 2009

(54) LIQUID CRYSTAL DISPLAY

(75) Inventors: Takahiro Igarashi, Kanagawa (JP);
Tsuneo Kusunoki, Kanagawa (JP);
Katsutoshi Ohno, Tokyo (JP)

(73) Assignee: Sony Corporation, Tokyo (JP)

( * ) Notice: Subject to any disclaimer, the term of this patent is extended or adjusted under 35 U.S.C. 154(b) by 534 days.

(21) Appl. No.: 11/383,654

(22) Filed: May 16, 2006

(65) Prior Publication Data

US 2007/0058105 A1    Mar. 15, 2007

(30) Foreign Application Priority Data

May 17, 2005    (JP)    ............................ P2005-144044

(51) Int. Cl.
*G02F 1/1335*    (2006.01)

(52) U.S. Cl. ............................... 349/70; 349/69; 349/71

(58) Field of Classification Search ................... 349/69, 349/70, 71
See application file for complete search history.

(56) References Cited

U.S. PATENT DOCUMENTS 7,006,172 B2 *    2/2006    Kawana et al. ................. 349/71

OTHER PUBLICATIONS

Phosphor Handbook, edited by Phosphor Research Society, First Edition, Ohmsha, 1987, p. 219, 228.
Takahashi, "Color filter for liquid crystal display," Journal of the Imaging Society of Japan, 2002, vol. 41, No. 1, p. 68.

* cited by examiner

*Primary Examiner*—David Nelms
*Assistant Examiner*—David Y Chung
(74) *Attorney, Agent, or Firm*—K & L Gates LLP (57) ABSTRACT

A liquid crystal display capable of expanding a color reproduction range in the case where a cold cathode fluorescent lamp is used as a light source is provided. A green phosphor of the cold cathode fluorescent lamp includes $BaMgAl_{10}O_{17}$: Eu, Mn. The wavelength range of a green emission spectrum is located on a shorter wavelength side than that in the case where the green phosphor includes $LaPO_4$:Ce, Tb, so the spectral width of the green emission spectrum is narrower. Therefore, an overlap between the wavelength ranges of green display light and red display light is reduced. Moreover, the spectral characteristics of blue display light (blue spectral characteristics) are set so as to satisfy predetermined conditional expressions. An overlap between the wavelength ranges of the green display light and the blue display light is also reduced.

9 Claims, 7 Drawing Sheets

LIQUID CRYSTAL DISPLAY

CROSS REFERENCES TO RELATED APPLICATIONS

The present invention contains subject matter related to Japanese Patent Application JP 2005-144044 filed in the Japanese Patent Office on May 17, 2005, the entire contents of which being incorporated herein by references.

BACKGROUND

The present invention relates to a liquid crystal display which displays an image through the use of a cold cathode fluorescent lamp (CCFL).

Liquid crystal displays are classified into several types according to lighting methods at the time of displaying an image. A typical liquid crystal display is a translucent liquid crystal display using a light source (a so-called backlight) disposed behind a liquid crystal panel. As such a light source, a cold cathode fluorescent lamp (CCFL) which is generally called a cold cathode tube is used.

For example, as a cold cathode fluorescent lamp for LCD television, $Y_2O_3$:Eu, $LaPO_4$:Ce, Tb and $BaMgAl_{10}O_{17}$:Eu are typically used as a red phosphor, a green phosphor and a blue phosphor, respectively (for example, refer to "Phosphor Handbook" edited by Phosphor Research Society, First Edition, Ohmsha, 1987, p. 219, p. 228, and T. Takahashi, "Color filter for liquid crystal display", Journal of the Imaging Society of Japan, 2002, Vol. 41, No. 1, p.68). $Y_2O_3$, $LaPO_4$ and $BaMgAl_{10}O_{17}$ are matrix materials, and Eu and (Ce, Tb) are luminescent centers.

Figure 7:
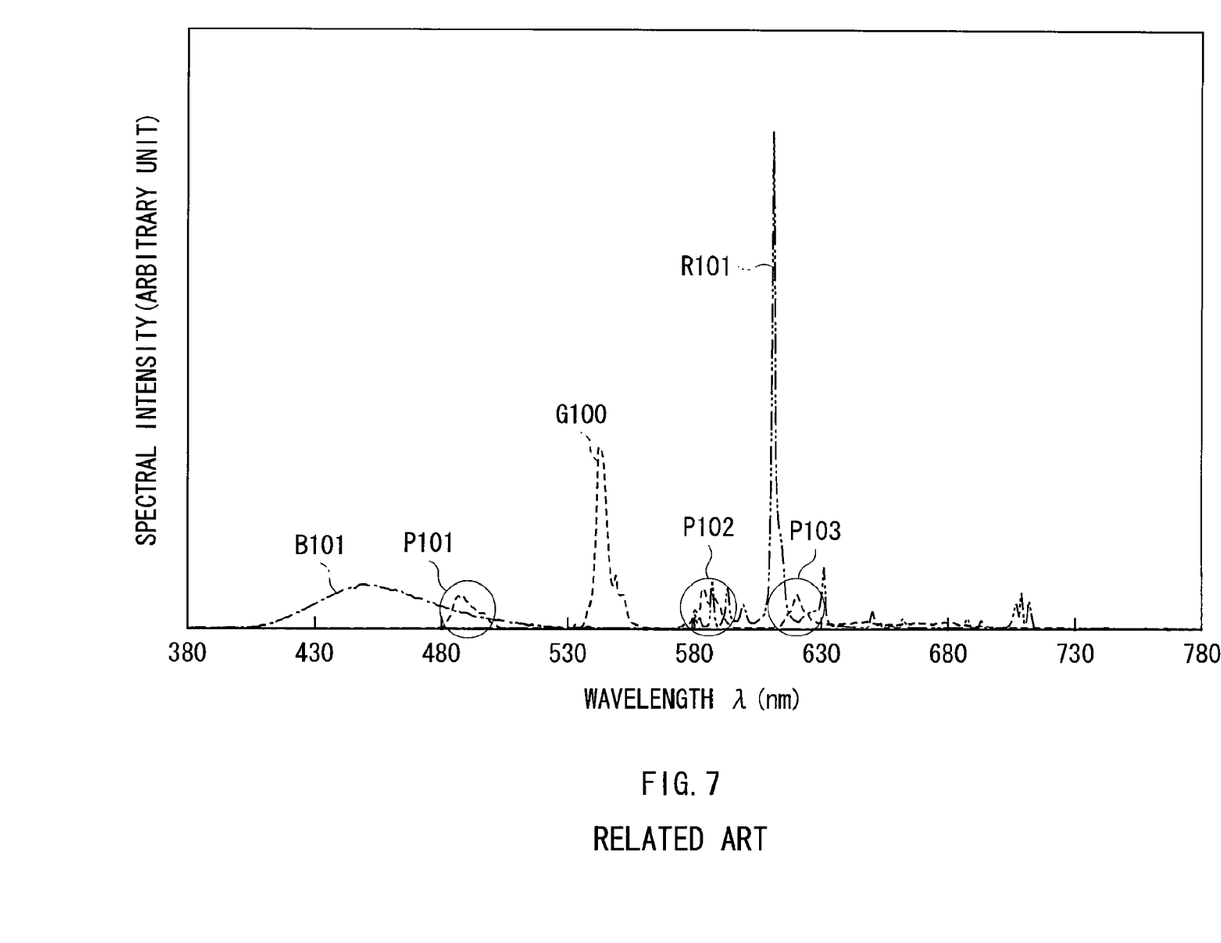
FIG. 7 is a plot showing the emission spectrum of each color phosphor in a liquid crystal display in a related art.

FIG. 7 shows emission spectral characteristics of each color phosphor. In the drawing, a red emission spectrum R101, a green emission spectrum G100 and a blue emission spectrum B101 show the emission spectra of the red phosphor $Y_2O_3$:Eu, the green phosphor $LaPO_4$:Ce, Tb and the blue phosphor $BaMgAl_{10}O_{17}$:Eu, respectively. The cold cathode fluorescent lamp as a backlight emits white light by such emission spectral characteristics of each color phosphor. Then, the white light is divided into primary colors, that is, red (R), green (G) and blue (B) by a color filter arranged in each pixel of a liquid crystal panel so as to display a color image.

SUMMARY

As shown by symbols P101, P102 and P103 in FIG. 7, the green emission spectrum G100 of the green phosphor $LaPO_4$:Ce, Tb is located in a wide wavelength range (a range of approximately 480 nm to 650 nm). Therefore, a wavelength range where the green emission spectrum G100 overlaps the red emission spectrum R101 or the blue emission spectrum B101 is wide, thereby the color purity of green light in display light is declined.

Therefore, it can be considered that $BaMgAl_{10}O_{17}$:Eu, Mn is used as a green phosphor instead of $LaPO_4$:Ce, Tb. The emission spectrum of the green phosphor $BaMgAl_{10}O_{17}$:Eu, Mn is located in a narrower wavelength range than the emission spectrum of $LaPO_4$:Ce, Tb, so a wavelength range where the emission spectrum overlaps the red emission spectrum R101 or the blue emission spectrum B101 becomes narrower, thereby as a result, the color purity of green light in display light is improved, and a green color can be well displayed.

The applicant of the present invention has carried out the following experiment in order to confirm this. More specifically, the chromaticity of each color light in display light is measured in the cases of using $LaPO_4$:Ce, Tb and $BaMgAl_{10}O_{17}$:Eu, Mn (two cases (1) and (2)) as a green phosphor in a cold cathode fluorescent lamp of a liquid crystal display. The following are the results of chromaticity measurements of green light and blue light, and the results are shown by chromaticity points (x and y coordinates) in an x-y chromaticity diagram.

$LaPO_4$:Ce, Tb . . . Chromaticity of green light (0.282, 0.588)
Chromaticity of blue light (0.143, 0.075)
$BaMgAl_{10}O_{17}$:Eu, Mn (1) . . . Chromaticity of green light (0.207, 0.630)
Chromaticity of blue light (0.139, 0.112)
$BaMgAl_{10}O_{17}$:Eu, Mn (2) . . . Chromaticity of green light (0.184, 0.656)
Chromaticity of blue light (0.141, 0.098)

From the results, in the case where $BaMgAl_{10}O_{17}$:Eu, Mn is used as the green phosphor, the x value is increased, and the y value is decreased, compared to the case where $LaPO_4$:Ce, Tb is used, so it is confirmed that the color purity is improved.

However, in blue light, compared to the case where $LaPO_4$:Ce, Tb is used, while the x value is equivalent, the y value is increased, so it is confirmed that the color purity is declined. Moreover, the y value of the blue light is larger than 0.08 which is the y value in the NTSC (National Television System Committee) standards, so the y value may not satisfy the NTSC standards which are broadcast standards, thereby the blue color may not be sufficiently displayed. In addition, when the y value of the blue light is larger than 0.08, the blue color becomes cyan.

Thus, in related arts, in the case where the cold cathode fluorescent lamp is used as the light source of the liquid crystal display, it is difficult for both of green light and blue light in display light to have high color purity, and it is difficult to achieve wide color reproducibility.

In view of the foregoing, it is desirable to provide a liquid crystal display capable of expanding a color reproduction range in the case where a cold cathode fluorescent lamp is used as a light source.

According to an embodiment of the invention, there is provided a liquid crystal display including: a cold cathode fluorescent lamp including a red phosphor, a green phosphor and a blue phosphor and emitting white light, the green phosphor including $BaMgAl_{10}O_{17}$:Eu, Mn and the blue phosphor including $BaMgAl_{10}O_{17}$:Eu; and a liquid crystal panel modulating the white light according to an image signal to emit the modulated white light as a display light, wherein assuming that the maximum peak intensity is Pbmax, the peak intensity at a wavelength of 506 nm is Pb(506 nm), the peak intensity at a wavelength of 530 nm is Pb(530 nm), and the peak intensity at a wavelength of 550 nm is Pb(550 nm), in blue spectral characteristics of the display light, Pbmax, Pb(506 nm), Pb(530 nm) and Pb(550 nm) satisfy the following conditional expressions (1) through (3):

$$Pb(506 \text{ nm})/Pb\text{max} \leq 0.550 \quad (1)$$

$$Pb(530 \text{ nm})/Pb\text{max} \leq 0.100 \quad (2)$$

$$Pb(550 \text{ nm})/Pb\text{max} \leq 0.025 \quad (3)$$

In the liquid crystal display according to the embodiment of the invention, the cold cathode fluorescent lamp including the red phosphor, the green phosphor and the blue phosphor emits white light using the phosphors. The white light is modulated in the liquid crystal panel according to an image signal to be emitted as display light. In this case, the green phosphor includes $BaMgAl_{10}O_{17}$:Eu, Mn, so the green emission spectrum in the cold cathode fluorescent lamp is located in a shorter wavelength side than that in related arts, and the spectral width of the green emission spectrum is narrower than that in related arts. Therefore, an overlap between green light and red light in display light is reduced. Moreover, the blue spectral characteristics of the display light are set so as to satisfy the predetermined conditional expressions, so an overlap between the wavelength ranges of green light and blue light in the display light is smaller than that in the related arts.

In the liquid crystal display according to the embodiment of the invention, the above-described liquid crystal panel can include a blue color filter selectively allowing only light in a blue wavelength range of the white light modulated according to the image signal to pass through, and the blue color filter can be formed so as to satisfy the above conditional expressions (1) through (3). Moreover, for example, when the blue color filter includes Pigment Blue (P.B.15:6) as a blue pigment and Pigment Violet (P.V.23) as a violet pigment, and the content ratio between Pigment Blue (P.B. 15:6) and Pigment Violet (P.V.23) is within a range from 3:7 to 4:6, the above conditional expressions (1) through (3) can be satisfied.

Here, "a blue wavelength range" means a wavelength range of blue light, and means a range of approximately 380 to 480 nm in the case where the light source is a cold cathode fluorescent lamp. Moreover, "P.B.15:6" means "a blue pigment with a Pigment Blue number 15:6", and "P.V.23" means "a violet pigment with a Pigment Violet number 23".

Moreover, the above red phosphor includes $Y_2O_3$:Eu, and assuming that the maximum peak intensity is Prmax, the peak intensity at a wavelength of 580 nm is Pr(580 nm) and the peak intensity at a wavelength of 600 nm is Pr(600 nm), in the red spectral characteristics of the above display light, Prmax, Pr(580 nm) and Pr(600 nm) can satisfy the following conditional expressions (4) and (5):

$$Pr(580 \text{ nm})/Pr\max \leq 0.200 \quad (4)$$

$$Pr(600 \text{ nm})/Pr\max \leq 0.850 \quad (5)$$

In this case, the above liquid crystal panel includes a red color filter selectively allowing only light in a red wavelength range of the white light modulated according to the image signal to pass through, and the red color filter can be formed so as to satisfy the above conditional expressions (4) and (5).

Moreover, the above red phosphor may include $YVO_4$:Eu or $Y(P, V)O_4$:Eu. In such a structure, the wavelength range of the red emission spectrum in the cold cathode fluorescent lamp is located on a longer wavelength side than that in the related arts, so an overlap between green light and red light in the display light is further reduced.

In addition, "a red wavelength range" means a wavelength range of red light as in the case of the above blue wavelength range, and means a range of approximately 580 nm to 700 nm in the case where the light source is a cold cathode fluorescent lamp.

In the liquid crystal display according to the embodiment of the invention, the green phosphor of the cold cathode fluorescent lamp includes $BaMgAl_{10}O_{17}$:Eu, Mn and the blue spectral characteristics of the display light are set so as to satisfy the predetermined conditional expressions, so in addition to an overlap between the wavelength ranges of the green light and the red light, an overlap between the wavelength ranges of the green light and the blue light in the display light is reduced, and the color purity of the green light and the blue light can be improved. Therefore, both of the green light and the blue light can have high color purity, and a color reproduction range can be expanded.

Other and further objects, features and advantages of the invention will appear more fully from the following description.

Additional features and advantages are described herein, and will be apparent from, the following Detailed Description and the figures.

DETAILED DESCRIPTION

A preferred embodiment will be described in detail below referring to the accompanying drawings.

Figure 1:
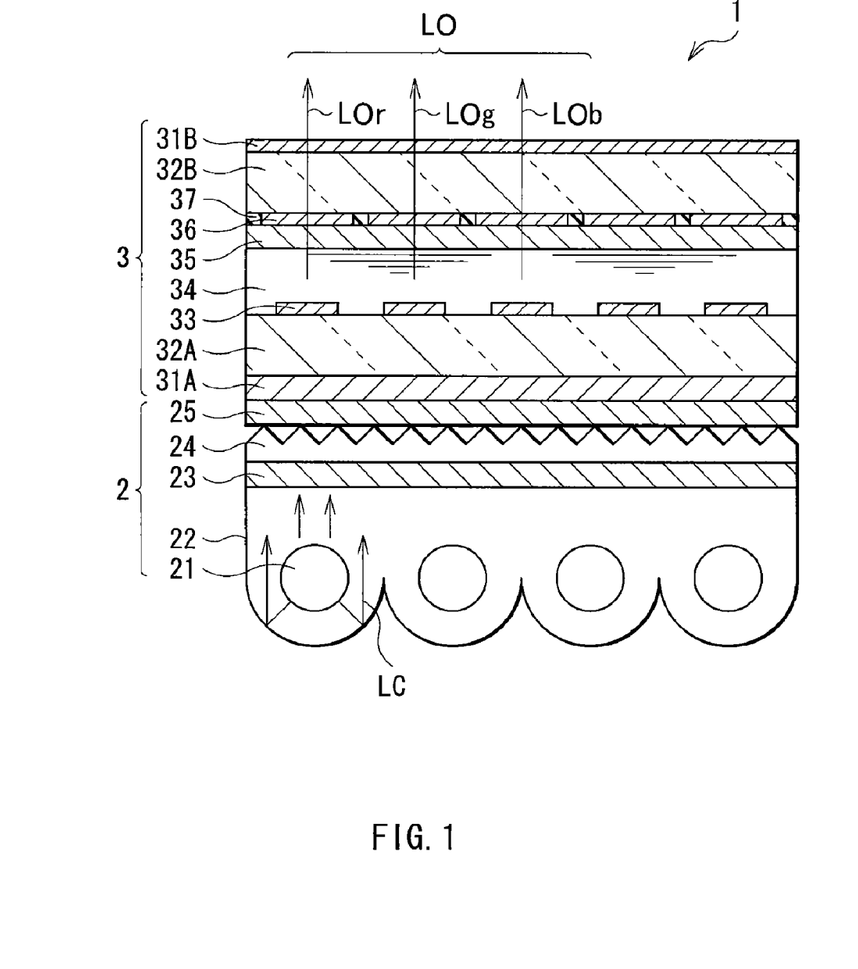
FIG. 1 is a sectional view of a liquid crystal display according to an embodiment of the invention.

FIG. 1 shows a sectional view of a liquid crystal display according to an embodiment of the invention. A liquid crystal display 1 includes a liquid crystal panel 3 and a lighting system 2 positioned behind the liquid crystal panel 3 (on a side opposite to a side where an image is viewed). In other words, the liquid crystal display 1 is a translucent liquid crystal display, and emits display light LO including red display light LOr, green display light LOg and blue display light LOb through the use of lamp light LC emitted from the lighting system 2.

In the lighting system 2, a plurality (four in FIG. 1) of cold cathode fluorescent lamps (CCFLs) 21 as light sources are arranged in parallel to one another. Moreover, a reflector plate 22 is disposed around the cold cathode fluorescent lamps 21 except for the liquid crystal panel 3 side. A diffusion sheet 23 and a prism sheet 24 are disposed on the liquid crystal panel 3 side of the plurality of cold cathode fluorescent lamps 21 in order from the cold cathode fluorescent lamps 21.

Each cold cathode fluorescent lamp 21 is a light source emitting white light to the liquid crystal panel 3, and includes a red phosphor for emitting red light, a green phosphor for emitting green light and a blue phosphor for emitting blue light. The red phosphor includes $YVO_4$:Eu or $Y(P,V)O_4$:Eu, the green phosphor includes $BaMgAl_{10}O_{17}$:Eu, Mn, and the blue phosphor includes $BaMgAl_{10}O_{17}$:Eu.

Figure 2:
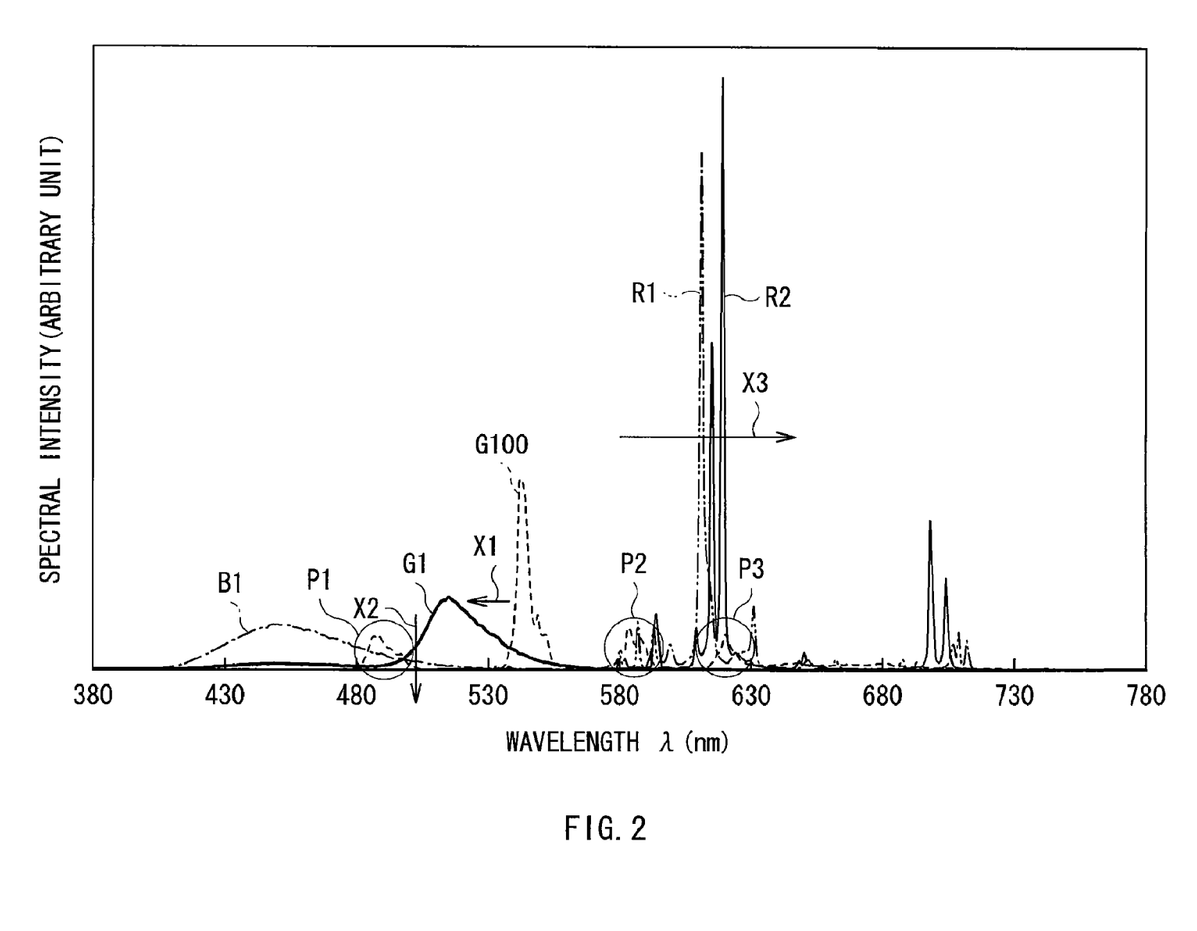
FIG. 2 is a plot showing the emission spectrum of each color phosphor in a cold cathode fluorescent lamp shown in FIG. 1.

FIG. 2 shows the emission spectrum of each color phosphor in the cold cathode fluorescent lamp 21 shown in FIG. 1. In the drawing, the horizontal axis indicates wavelength λ (nm), and the vertical axis indicates spectral intensity (arbitrary unit). Moreover, a red emission spectrum R2, a green emission spectrum G1 and a blue emission spectrum B1 indicate the emission spectrum of the red phosphor $YVO_4$:Eu (or $Y(P,V)O_4$:Eu), the green phosphor $BaMgAl_{10}O_{17}$:Eu, Mn and the blue phosphor $BaMgAl_{10}O_{17}$:Eu, respectively. As a comparative example relative to these emission spectra, the emission spectrum of a red phosphor $Y_2O_3$:Eu, and the emission spectrum of a green phosphor $LaPO_4:Ce, Tb$ are shown as a red emission spectrum R1 and a green emission spectrum G100, respectively.

The green emission spectrum G1 has a narrower wavelength range than the green emission spectrum G100 having a wide wavelength range as shown by symbols P101 through P103. Moreover, as shown by an arrow X1, the wavelength range of the green emission spectrum G1 is located on a shorter wavelength side than the wavelength range of the green emission spectrum G100. Therefore, in the green emission spectrum G1, compared to the case of the green emission spectrum G100, a wavelength range where the green emission spectrum G1 overlaps the red emission spectrum R1 is narrower, and as a result, an overlap between the wavelength ranges of the green display light LOg and the red display light LOr emitted from the liquid crystal panel 2 is reduced.

As described above, the wavelength range of the green emission spectrum G1 is located on a shorter wavelength side, so compared to the case of the green emission spectrum G100, a wavelength range where the green emission spectrum G1 overlaps the blue emission spectrum B1 is expanded. Therefore, the spectral characteristics of the blue display light LOb (blue spectral characteristics) are set so as to satisfy the following conditional expressions (1) through (3). When the blue spectral characteristics are set in such a manner, an overlap between the wavelength ranges of the green display light LOg and the blue display light LOb is also reduced.

$$Pb(506\ nm)/Pb\max \leq 0.550 \quad (1)$$

$$Pb(530\ nm)/Pb\max \leq 0.100 \quad (2)$$

$$Pb(550\ nm)/Pb\max \leq 0.025 \quad (3)$$

In the above conditional expressions (1) through (3), the maximum peak intensity is Pbmax, the peak intensity at a wavelength of 506 nm is Pb(506 nm), the peak intensity at a wavelength of 530 nm is Pb(530 nm), and the peak intensity at a wavelength of 550 nm is Pb(550 nm).

Moreover, the red emission spectrum R2 is located on a shorter wavelength side than the red emission spectrum R1. Therefore, in the red emission spectrum R2, compared to the case of the red emission spectrum R1, a wavelength range where the red emission spectrum R2 overlaps the green emission spectrum G1 is narrower, so from this point, an overlap between the wavelength ranges of the green display light LOg and the red display light LOr is reduced.

In the case where the red phosphor includes $Y_2O_3:Eu$ (in the case of the red emission spectrum R1), the spectral characteristics of the red display light LOr (red spectral characteristics) may be set so as to satisfy the following conditional expressions (4) and (5). In the case where the red spectral characteristics are set in such a manner, an overlap between the wavelength ranges of the green display light LOg and the red display light LOr is reduced.

$$Pr(580\ nm)/Pr\max \leq 0.200 \quad (4)$$

$$Pr(600\ nm)/Pr\max \leq 0.850 \quad (5)$$

In the above conditional expressions (4) and (5), the maximum peak intensity is Prmax, the peak intensity at a wavelength of 580 nm is Pr(580 nm), and the peak intensity at a wavelength of 600 nm is Pr(600 nm).

Referring back to FIG. 1, the reflector plate 22 reflects white light (the lamp light LC) emitted from the cold cathode fluorescent lamps 21 to the liquid crystal panel 3. Thereby, the lamp light LC emitted from the cold cathode fluorescent lamps 21 can be effectively used.

The diffusion sheets 23 and 25 diffuse the lamp light LC toward the liquid crystal panel 3 so as to reduce unevenness in brightness. Moreover, the prism sheet 24 orients the direction of the lamp light LC.

The liquid crystal panel 3 has a laminate structure including a multilayer film between a pair of glass substrates 32A and 32B (a glass substrate 32A on the lighting system 2 side and a glass substrate 32B on a viewer's side). The multilayer film includes a transparent pixel electrode 33 disposed on each pixel, a liquid crystal layer 34, a transparent electrode 35 shared among pixels, a color filter 36 disposed corresponding to each pixel and a black matrix 37 formed between color filters 36 in order from the lighting system 2. Moreover, polarizing plates 31A and 31B are formed on surfaces of the glass substrates 32A and 32B opposite to the liquid crystal layer 34, respectively.

The polarizing plates 31A and 31B are a kind of optical shutter, and allow only light in a specific vibration direction (polarized light) to pass through. The polarizing plates 31A and 31B are disposed so that the polarizing axes thereof are 90 degrees different from each other, thereby the lamp light LC from the lighting system 2 passes through or is blocked by the polarizing plates 31A and 31B via the liquid crystal layer 34.

Typically, the glass substrates 32A and 32B are transparent substrates which are transparent to visible light. Therefore, the glass substrate 32A and 32B are not necessarily glass substrates, and may be made of any material which is transparent to visible light. On the glass substrate 32A, a TFT (thin film transistor) as a driving device electrically connected to the transparent pixel electrode 33 and a driving circuit (not shown) including wiring or the like are formed.

The transparent pixel electrode 33 is made of, for example, ITO (Indium Tin Oxide), and functions as a pixel electrode for each pixel. Moreover, the transparent electrode 35 is also made of, for example, ITO, and functions as a common opposite electrode.

The liquid crystal layer 34 is made of, for example, a TN (Twisted Nematic) mode liquid crystal, a STN (Super Twisted Nematic) mode liquid crystal or the like, and allows the lamp light LC from the lighting system 2 to pass through each pixel or blocks the lamp light LC by each pixel according to a voltage applied from a driving circuit (not shown).

The black matrix 37 is disposed between the color filters 36, and blocks the lamp light LC from the lighting system 2 so as not to emit the lamp light LC to the viewer's side of the liquid crystal panel 3.

The color filter 36 divides the lamp light LC from the lighting system 2 into the primary colors, that it, red (R), green (G) and blue (B), and includes a red color filter selectively allowing only light in a red wavelength range (a range of approximately 580 nm to 700 nm) in the lamp light LC which is white light to pass through, a green color filter selectively allowing only light in a green wavelength range (a range of approximately 460 nm to 640 nm) to pass through and a blue color filter selectively allowing only light in a blue wavelength range (a range of approximately 380 nm to 480 nm) to pass through. The color filter 36 is obtained through mixing an acrylic resin and a pigment of each color to form a mixture, and adding a photopolymerization monomer and a photopolymerization initiator to the mixture so as to adjust a photosensitive colored composition.

As the acrylic resin, a resin with a molecular weight of approximately 5000 to 100000 which is formed through synthesizing approximately three to five kinds of monomers selected from the group consisting of alkyl acrylate such as acrylic acid, methacrylic acid, methylacrylate, methylmethacrylate, ethylacrylate, ethylmethacrylate, butylacrylate or butylmethacrylate, alkyl methacrylate, cyclic cyclohexyl acrylate, hydroxyethyl acrylate and methacrylate is used.

Moreover, as a pigment for the red color filter, a yellow pigment C.I. (color index) Pigment Yellow (P.Y.) 254 (P.Y.254) is used. The spectral characteristics of the red display light LOr can be set by the red color filter (for example, by the transmission characteristics of the red color filter) so as to satisfy the above-described conditional expressions (4) and (5).

As pigments for the blue color filter, blue pigments with the following C.I. Pigment Blue (P.B.) numbers, and violet pigments with the following C.I. Pigment Violet (P.V.) numbers are used.

P.B. . . . 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 77, 78, 79

P.V. . . . 1, 1:1, 2, 2:2, 3, 3:1, 3:3, 5, 5:1, 14, 15, 16, 19, 23, 25, 27, 29, 31, 32, 37, 39, 42, 44, 47, 49, 50

As in the case of the red color filter, the spectral characteristics of the blue display light LOb can be set by the blue color filter so as to satisfy the following conditional expressions (1) through (3). More specifically, when the blue color filter includes P.B.15:6 as a blue pigment and P.V.23 as a violet pigment, and the content ratio between P.B.15:6 and P.V.23 is within a range from 3:7 to 4:6, the spectral characteristics of the blue display light LOb can be set so as to satisfy the conditional expressions (1) through (3). When the content ratio between P.B.15:6 and P.V.23 is set within such a range, the transmission characteristics of the blue color filter are adjusted, thereby the blue spectral characteristics satisfy the conditional expressions (1) through (3).

In order to uniformly disperse the pigment of each color in the photosensitive colored composition, a small amount of a dispersant (approximately 2 to 5 wt % relative to the pigment) is preferably added. As the dispersant, more specifically, a wide range of dispersants such as surfactants, pigment intermediates and dye intermediates are used. Moreover, as the dispersant, an organic dye derivative is preferably used, and as an organic dye as the matrix material of the derivative, azo series, phthalocyanine series, quinacridone series, anthraquinone series, perylene series, thioindigo series, dioxane series and pyrrole series metal complex salt series and the like are cited.

As the photopolymerization monomer, a bifunctional monomer, a trifunctional monomer, a multifunctional monomer or the like is cited. Among them, as the bifunctional monomer, 1,6-hexanedioldiacrylate, ethylene glycol diacrylate, neopentyl glycol diacrylate, triethylene glycol diacrylate or the like is cited. Moreover, as the trifunctional monomer, trimethylol propane triacrylate, pentaerythritol triacrylate, tris(2-hydroxyethyl) isocyanate or the like is cited. As the multifunctional monomer, ditrimethylol propane tetraacrylate, dipentaerythritol pentaacrylate, dipentaerythritol hexaacrylate or the like is cited. The addition amount of the photopolymerization monomer is approximately 30 to 230 parts by weight relative to an acrylic resin for dispersion, but the addition amount is not specifically limited to this.

As the photopolymerization initiator, a triazine compound, an acetophenone compound, a benzophenone compound, a thioxanthone compound, an imidazole compound or the like is cited.

Among them, as the triazine compound, 2,4,6-tris(trichloromethyl)-S-triazine, 2-(P-methoxystyryl)-4,6-bis(trichloromethyl)-S-triazine, 2phenyl-4,6-bis(trichloromethyl)-S-triazine, 2-(p-methoxyphenyl)-4,6-bis(trichloromethyl)-S-triazine, 2-(p-chlorophenyl)-4,6-bis(trichloromethyl)-S-triazine, 2-(4'-methoxy-1'-naphthyl)-4,6-bis(trichloromethyl)-S-triazine or the like is cited.

As the acetophenone compound, 2-methyl-2-morpholino (4-thiomethylphenyl)propane-1-one, diethoxyacetophenone, 2-hydroxy-2-methyl-1-enyl(4-dodecyl)propane-1-one or the like is cited.

As the benzophenone compound, benzophenone, 4,4-diethylamino benzophenone, 3,3-dimethyl-4-methoxybenzophenone, o-benzophenone metyl benzoate or the like is cited.

As the thioxanthone compound, 2,4-diethylthioxanthone, 2,4-diisopropylthioxanthone, 2,4-dimethylthioxanthone or the like is cited.

As the imidazole compound, 2-(2,3-dichlorophenone)-4, 5-diphenyl-imidazole dimer, 2-(2,3-dichlorophenyl)-4,5-bis (3-methoxyphenyl)-imidazole dimer, 2-(2,3-dichlorophenyl)-4,5-bis(4-methoxyphenyl)-imidazole dimer, 2-(2,3-dichlorophenyl)-4,5-bis(4-chlorophenyl)-imidazole dimer, 2,2'-bis(2-chlorophenyl)-4,5,4',5'-tetraphenyl-1-2'-biimidazole or the like is cited.

The addition amount of the photopolymerization initiator is not specifically limited; however, the addition amount in the case where one or two kinds of triazine compounds are used is preferably approximately 5 to 40 parts by weight relative to the photopolymerization monomer, and approximately 10 to 25 parts by weight of one or two kinds are more preferably added. At this time, another photopolymerization initiator made of a triazine compound may be mixed. Moreover, the total amount of the photopolymerization initiator is preferably approximately 10 to 25 parts by weight relative to the photopolymerization monomer.

As a solvent used to mix them, methanol, ethanol, toluene, xylene, ethylcellosolve, ethylcellosolve acetate, diglyme, cyclohexanone, ethylbenzene, isoamyl acetate, amylacetate, propylene glycol monomethyl ether, propylene glycol monoethyl ether, diethylene glycol, diethylene glycol monomethyl ether, diethylene glycol monoethyl ether, triethylene glycol, triethylene glycol monomethyl ether, triethylene glycol monoethyl ether, liquid polyethylene glycol, 1-methoxy-2-propanol, dipropylene glycol, dipropylene glycol monomethyl ether, ethyl lactate or the like is used. Solubility depends on the monomer composition of a resin, the photopolymerization monomer, the photopolymerization initiator or the like, so a single solvent or a mixture of a plurality of solvents is preferably selected as necessary.

Next, as an example of a method of manufacturing the liquid crystal display 1 with such a structure, methods of manufacturing the lighting system 2 and the liquid crystal panel 3 will be separately described below.

The lighting system 2 can be manufactured through, for example, the following steps.

At first, the cold cathode fluorescent lamp 21 is formed as follows. Each color phosphor made of the above-described material is mixed with a solution formed through dissolving nitrocellulose in an organic solvent, thereby a suspension is formed. Next, the suspension is poured into a glass tube, and dried. Then, an excitation gas made of mercury or a noble gas is enclosed in the glass tube, and an electrode is attached to the glass tube, thereby the cold cathode fluorescent lamp 21 is formed.

Next, a plurality of cold cathode fluorescent lamps 21 are arranged in parallel to one another, and the reflector plate 22, the diffusion sheet 23 and the prism sheet 24 which are separately formed are arranged around the cold cathode fluorescent lamps 21, thereby the lighting system 2 shown in FIG. 1 is completed.

On the other hand, the liquid crystal panel 3 can be manufactured through, for example, the following steps.

At first, the polarizing plate 31A is attached to the back surface of the glass substrate 32A made of the above-described material through the use of, for example, an adhesive. Next, the transparent pixel electrode 33 made of the above-described material with a predetermined shape is formed on the front surface of the glass substrate 32A by, for example, a vapor deposition method, a sputtering method or a CVD (Chemical Vapor Deposition) method and, for example, photolithography and etching. Then, an alignment film (not shown) with, for example, a thickness of approximately 50 nm is formed on the glass substrate 32A and the transparent pixel electrode 33 by, for example, a spin method, and the alignment film is dried.

Next, the polarizing plate 31B is attached to the back surface of the glass substrate 32B made of the above-described material through the use of, for example, an adhesive. Then, the black matrix 37 with a predetermined shape is formed on the front surface of the glass substrate 32B by, for example, a vapor deposition method, a sputtering method or a CVD method and, for example, photolithography and etching.

Next, the color filter 36 for each color is formed as follows. At first, the acrylic resin made of the above-described material is dissolved in a solvent made of the above-described material to react for a few hours, thereby a resin is formed. Next, the resin is diluted with a solvent again to form a diluted resin. Then, a pigment of each color which is made of the above-described material is mixed with the diluted resin, and a dispersant is added to the diluted resin, and the diluted resin is kneaded by three rolls so as to form a colored paste corresponding to each color. Next, the photopolymerization monomer made of the above-described material and the photopolymerization initiator made of the above-described material are added to the colored paste, and the above-described diluted resin is further added to the colored paste so as to form photosensitive color filter slurry. Next, the glass substrate 32B and the black matrix 37 are covered with the photosensitive color filter slurry by, for example, a spin coat method, and the photosensitive color filter slurry is dried. Then, the photosensitive color filter slurry is baked for, for example, approximately 30 minutes at, for example, 70° C. Next, the photosensitive color filter slurry is exposed through the use of a mask, alkaline cleaned, and dried for, for example, 30 minutes at, for example, 250° C., and then a predetermined patterning process is performed. Thus, the color filter 36 corresponding to each color with a thickness of, for example, approximately 2.5 μm is formed.

Next, the transparent electrode 35 made of the above-described material with a thickness of, approximately 130 nm is formed on the color filter 36 and the black matrix 37 by, for example, a vapor deposition method, a sputtering method or a CVD method, and the transparent electrode 35 is dried. Then, an alignment film (not shown) with a thickness of, for example, approximately 50 nm is formed on the transparent electrode 35 by, for example, a spin method, and the alignment film is dried.

Then, the glass substrate 32A and the glass substrate 32B are laminated with a spherical or columnar spacer (not shown) in between so that the transparent pixel electrode 33 and the transparent electrode 35 face each other, and they are bonded together by an ultraviolet cure resin or the like. Next, the above-described mode liquid crystal is injected between the glass substrates 32A and 32B so as to form the liquid crystal layer 34, thereby the liquid crystal panel 3 shown in FIG. 1 is completed.

Finally, the lighting system 2 and the liquid crystal panel 3 which are manufactured in such a manner are arranged so as to face each other, and they are fixed with a screw to be put together. Thus, the liquid crystal display 1 shown in FIG. 1 is completed.

In the liquid crystal display according to the embodiment, the lamp light LO which is white light is emitted from the cold cathode fluorescent lamp 21 including the red phosphor, the green phosphor and the blue phosphor. The lamp light LO is emitted to the liquid crystal panel 3 by the reflector plate 22, and the unevenness in the brightness of the lamp light LO is reduced by the diffusion sheet 23, and the direction of the lamp light LO is oriented by the prism sheet 24. The lamp light LO entering the liquid crystal panel 3 is modulated by a voltage applied between the each transparent pixel electrode 33 and the transparent electrode 35 according to an image signal, and is divided into primary colors by the color filter 36 corresponding to each color. Therefore, the display light LO including the red display light LOr, the green display light LOg and blue display light LOb is emitted to the screen on a viewer's side of the liquid crystal panel 2 so as to display a color image.

In this case, the green phosphor includes $BaMgAl_{10}O_{17}$:Eu, Mn, so the green emission spectrum G1 in the cold cathode fluorescent lamp 21 is located on a shorter wavelength side than the green emission spectrum G100 in the case where the green phosphor includes $LaPO_4$:Ce, Tb, and the spectral width of the green emission spectrum G1 is narrower than that of the green emission spectrum G100. As a result, an overlap between the wavelength ranges of the green display light LOg and the red display light LOr is reduced. Moreover, the spectral characteristics of the blue display light LOb (the blue spectral characteristics) are set so as to satisfy the above conditional expressions (1) through (3), so compared to the case of the green emission spectrum G100, an overlap between the wavelength ranges of the green display light LOg and the blue display light LOb is reduced.

As described above, in the embodiment, the green phosphor of the cold cathode fluorescent lamp 21 includes $BaMgAl_{10}O_{17}$:Eu, Mn, and the blue spectral characteristics satisfy the above conditional expressions (1) through (3), so in addition to an overlap between the wavelength ranges of the green display light LOg and the blue display light LOb, an overlap between the wavelength ranges of the green display light LOg and the blue display light LOb is reduced, and it is obvious from the following examples that the color purity of the green display light LOg and the blue display light LOb can be improved. Therefore, both of the green display light LOg and the blue display light LOb can have high color purity, and a color reproduction range can be expanded.

Moreover, as the purity of the blue display light LOb is improved to expand the color reproduction range, the broadcast standards NTSC can be satisfied, and even in the case where $BaMgAl_{10}O_{17}$:Eu, Mn is used as the green phosphor, blue colors in nature can be displayed without any difficulty.

Further, the blue color filter includes P.B.15:6 (a blue pigment) and P.V.23 (a violet pigment), and the content ratio between P.B.15:6 and P.V.23 is within a range from 3:7 to 4:6, so the blue spectral characteristics can be adjusted by the transmittance of the blue color filter. Therefore, the above conditional expressions (1) through (3) can be satisfied through the use of the blue color filter, and the color purity of the blue display light LOb can be improved.

Moreover, the red phosphor of the cold cathode fluorescent lamp 21 includes $YVO_4$:Eu or $Y(P,V)O_4$:Eu, so the wavelength range of the red display light LOr can be shifted to a shorter wavelength side than that in the case where the red phosphor includes $Y_2O_3$:Eu, thereby an overlap between the wavelength ranges of the green display light LOg and the red display light LOr can be reduced. Therefore, the color purity of the red display light LOr can be also improved, and the color reproduction range can be further expanded.

Even in the case where the red phosphor includes $Y_2O_3$:Eu as in related arts, when the above conditional expressions (4) and (5) are satisfied by, for example, the transmittance of the red color filter, the red spectral characteristics can be adjusted, and as in the case where the red phosphor includes $YVO_4$:Eu or $Y(P,V)O_4$:Eu, an overlap between the wavelength ranges of the green display light LOg and the red display light LOr can be reduced. Therefore, the color reproduction range can be expanded, and even in the case where the red phosphor includes $Y_2O_3$ Eu, blue colors in nature can be displayed without any difficulty.

EXAMPLES

Specific examples of the invention will be described below.

Example 1

A liquid crystal display with a structure shown in FIG. 1 in which all color filters 36 are blue filters was formed as follows.

At first, the blue color filters were formed as follows. 15 parts of methacrylic acid, 35 parts of butylacrylate and 50 parts of butylmethacrylate as acrylic resins were dissolved in 280 parts of ethylcellosolve (a solvent), and 0.8 parts of azoisobutylnitrile was added in order to improve solubility under a nitrogen atmosphere. The acrylic resins reacted for 5 hours at 70° C. to obtain a resin, and the obtained resin was diluted with ethylcellosolve (a solvent) to form a diluted resin.

Next, 4.0 g of P.B.15:6 as a blue pigment and 6.0 g of P.V. as a violet pigment were mixed with 50 g of the diluted resin, and 30 g of cyclohexane as a solvent and 1 g of a dispersant were added to the resin. The resin was kneaded by three rolls to form a colored paste corresponding to blue.

Next, 5 g of dipentaerythritol pentaacrylate as a photopolymerization monomer (a multifunctional monomer), 0.8 g of 2-methyl-1-(4-(methylthio)phenyl)-2-morpholino-propane-1-one and 0.2 g of methoxystyryl triazine as photopolymerization initiators were added to 50 g of the colored paste, and 5 g of the above diluted resin was added to the colored paste, thereby photosensitive color filter slurry was formed.

Next, the glass substrate 32B and the black matrix 37 which were separately formed were covered with the photosensitive color filter slurry by a spin coat method, and the photosensitive color filter slurry was dried. After that, the photosensitive color filter slurry was baked for 30 minutes at 70° C. Then, the photosensitive color filter slurry was exposed through the use of a mask at an irradiation intensity of 380 mJ/cm$^2$. After that, the photosensitive color filter slurry was alkaline cleaned, and dried for 30 minutes at 250° C., and then a predetermined patterning process was performed. Thus, the blue color filter with a thickness of approximately 2.5 μm was formed.

Next, the transparent electrode 35 made of ITO with a thickness of approximately 130 nm was formed on the blue color filter and the black matrix 37 by a sputtering method, and after that, the transparent electrode 35 was dried for 1 hour at 230° C. Then, an alignment film with a thickness of 50 nm was formed on the transparent electrode 35 by a spin method, and after that, the alignment film was dried.

Next, the glass substrate 32A and the glass substrate 32B were laminated with a spacer in between so that the transparent pixel electrode 33 and the transparent electrode 35 faced each other, and they were bonded together. A liquid crystal was injected between the glass substrates 32A and 32B to form the liquid crystal layer 34. Thus, the liquid crystal panel 3 was formed.

Finally, the lighting system 2 which was separately formed so that the red phosphor, the green phosphor and the blue phosphor of the cold cathode fluorescent lamp 21 were $YVO_4$:Eu, $BaMgAl_{10}O_{17}$:Eu, Mn and $BaMgAl_{10}O_{17}$:Eu, respectively and the liquid crystal panel 3 were arranged so as to face each other, and they were fixed with a screw to be put together, thereby the liquid crystal display was formed.

Example 2

Blue color filters and a liquid crystal display were formed as in the case of Example 1, except that 3.0 g of P.B.15:6 as a blue pigment and 7.0 g of P.V. as a violet pigment were used.

Comparative Example 1

As a comparative example relative to Examples 1 and 2, blue color filters and a liquid crystal display were formed as in the case of Example 1, except that 6.0 g of P.B.15:6 as a blue pigment and 4.0 g of P.V. as a violet pigment were used.

Comparative Example 2

As a comparative example relative to Examples 1 and 2, blue color filters and a liquid crystal display were formed as in the case of Example 1, except that 4.5 g of P.B.15:6 as a blue pigment and 5.5 g of P.V. as a violet pigment were used.

(Evaluation)

The spectral intensity and the chromaticity point (x and y coordinates) of the blue display light LOb in each of the liquid crystal displays of Examples 1 and 2 and Comparative Examples 1 and 2 were determined. Table 1 shows the content ratio of each pigment in the blue color filter, the standardized spectral intensities of the blue display light LOb at a wavelength λ=506 nm, 530 nm and 550 nm and the chromaticity point (x and y coordinates) of the blue display light LOb in each of the liquid crystal displays of Examples 1 and 2 and Comparative Examples 1 and 2.

TABLE 1

| | PIGMENT OF BLUE COLOR FILTER | | STANDARDIZED SPECTRAL INTENSITY OF BLUE LIGHT | | | CHROMATICITY POINTS OF BLUE LIGHT | |
|---|---|---|---|---|---|---|---|
| | P.B.15:6 | P.V.23 | | | | | |
| | (g) | (g) | λ = 506 nm | λ = 530 nm | λ = 550 nm | x VALUE | y VALUE |
| EXAMPLE 1 | 4.0 | 6.0 | 0.55 | 0.10 | 0.024 | 0.141 | 0.0750 |
| EXAMPLE 2 | 3.0 | 7.0 | 0.42 | 0.07 | 0.018 | 0.143 | 0.0713 |
| COMPARATIVE EXAMPLE 1 | 6.0 | 4.0 | 0.77 | 0.14 | 0.035 | 0.139 | 0.1120 |

TABLE 1-continued

| | PIGMENT OF BLUE COLOR FILTER | | STANDARIZED SPECTRAL INTENSITY OF BLUE LIGHT | | | CHROMATICITY POINTS OF BLUE LIGHT | |
|---|---|---|---|---|---|---|---|
| | P.B.15:6 | P.V.23 | | | | | |
| | (g) | (g) | $\lambda = 506$ nm | $\lambda = 530$ nm | $\lambda = 550$ nm | x VALUE | y VALUE |
| COMPARATIVE EXAMPLE 2 | 4.5 | 5.5 | 0.67 | 0.12 | 0.030 | 0.140 | 0.0900 |

Figure 3:
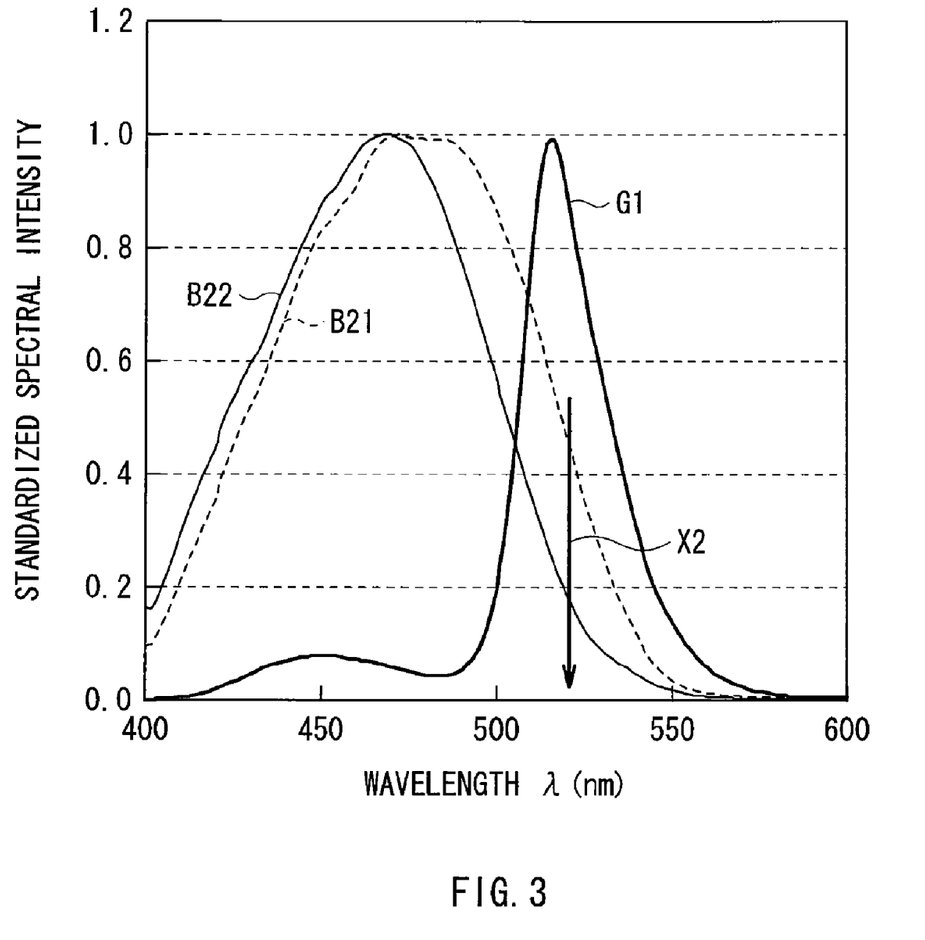
FIG. 3 is a plot for describing a positional relationship between the emission spectrum of a green phosphor and the transmission spectrum of blue light.
Figure 4A:
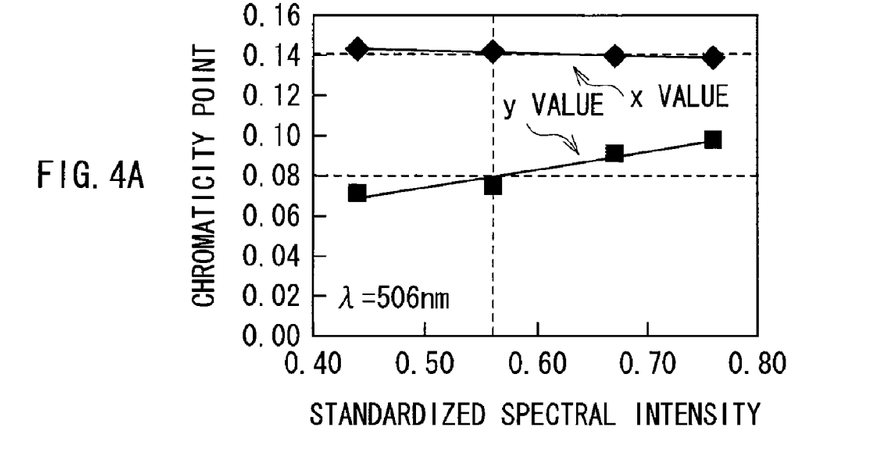
FIGS. 4A, 4B and 4C are plots showing a relationship between the spectral intensity of blue light and chromaticity points.
Figure 4B:
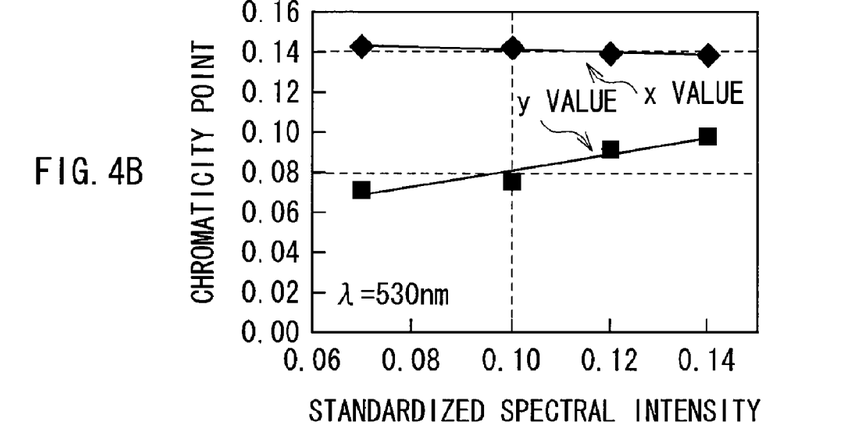
Figure 4C:
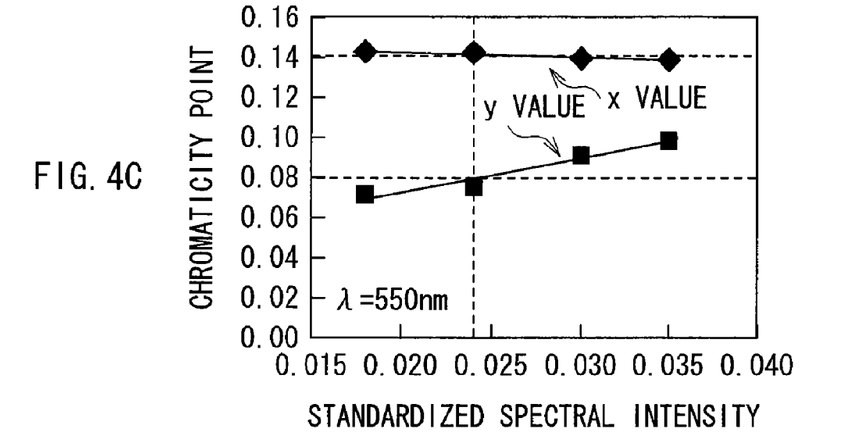
Figure 5:
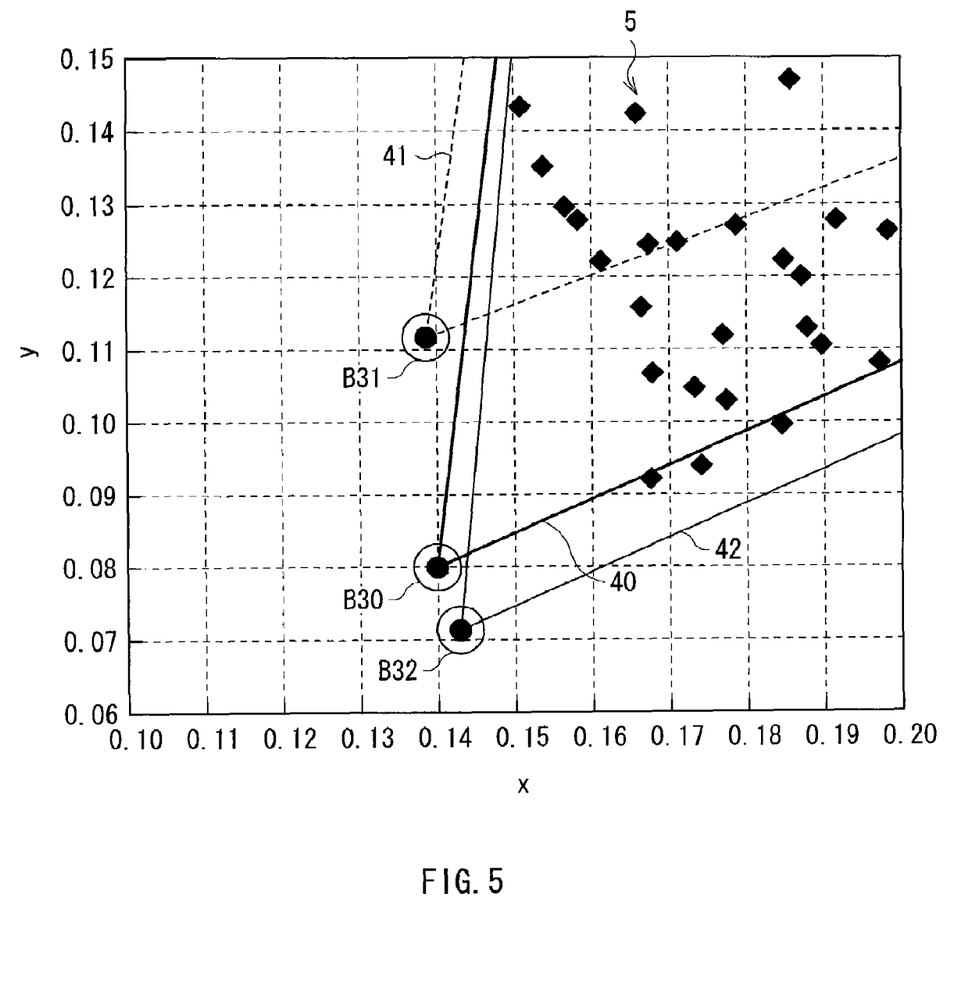
FIG. 5 is a plot of an example of the chromaticity points of blue light by a chromaticity diagram.

Moreover, FIG. 3 shows a positional relationship between the emission spectrum of the green phosphor BaMgAl$_{10}$O$_{17}$: Eu, Mn and the transmission spectrum of the blue display light LOg, and in the drawing, a symbol G1 indicates the green emission spectrum of MgAl$_{10}$O$_{17}$:Eu, Mn, and symbols B21 and B22 indicate the transmission spectrum of the blue display light LOg in Comparative Example 1 and Example 1, respectively. FIGS. 4A, 4B and 4C show a relationship between the standardized spectral intensity of the blue display light LOb and the chromaticity points, and FIGS. 4A, 4B and 4C indicate characteristics at a wavelength $\lambda=506$ nm, 530 nm and 550 nm, respectively. FIG. 5 shows a xy chromaticity diagram of the chromaticity points of the blue display light LOb, and symbols 40 through 42 in the drawing indicate the color reproduction ranges of the NTSC, Comparative Example 1 and Example 2, respectively, and symbols B30 through B32 indicate the chromaticity points of the blue display light LOb in the NTSC, Comparative Example 1 and Example 2, respectively, and a symbol 5 indicates the chromaticity point of an object in nature.

As shown in Table 1, in Examples 1 and 2 in which the content ratio between the blue pigment P.B. 15:6 and the violet pigment P.V.23 was within a range from 3:7 to 4:6, compared to Comparative Examples 1 and 2 in which the content ratio was out of the range (the content ratio was 6:4 and 4.5:5.5, respectively), the standardized spectral intensities of the blue display light LOb at a wavelength $\lambda=506$ nm, 530 nm and 550 nm were declined. As a result, while the above conditional expressions (1) through (3) were satisfied in Examples 1 and 2 (Pb(506 nm)/Pbmax$\leq$0.550, Pb(530 nm)/Pbmax$\leq$0.100, Pb(550 nm)/Pbmax$\leq$0.025), the above conditional expressions (1) through (3) were not satisfied in Comparative Examples 1 and 2. Therefore, when the content ratio between the blue pigment P.B.15:6 and the violet pigment P.V.23 was set within a range from 3:7 to 4:6, the spectral characteristics of the blue display light LOb (the blue spectral characteristics) satisfied the above conditional expressions (1) through (3), and as shown by an arrow X2 in FIG. 3, an overlap between the wavelength ranges of the emission spectrum of the green phosphor BaMgAl$_{10}$O$_{17}$:Eu, Mn and the transmission spectra B21 and B22 of the blue display light LOb was reduced. Therefore, an overlap between the wavelength ranges of the green display light LOg and the blue display light LOb was also reduced, and as shown in Table 1 and FIGS. 4A, 4B and 4C, it was found out that in Examples 1 and 2, compared to Comparative Examples 1 and 2, the y value of the chromaticity point of the blue display light LOb was increased (the x value was hardly changed). In other words, the color purity of the blue display light LOb was improved, and as shown in FIG. 5, in Examples 1 and 2, compared to Comparative Examples 1 and 2, the color reproduction range was expanded. Therefore, it was found out that while the chromaticity point 5 of the object in nature was not perfectly displayed in the color reproduction range 40 of the NTSC and the color reproduction range 41 of Comparative Example 1, the chromaticity point 5 of the object in nature was perfectly displayed in Example 2. Moreover, it was obvious from Table 1 and FIGS. 4A, 4B and 4C that as the content ratio of the violet pigment P.V.23 increased, the y value of the chromaticity point of the blue display light LOb increased, and the color purity was improved. In Examples 1 and 2 and Comparative Examples 1 and 2, the NTSC ratio was examined, the NTSC ratio was 92% in Example 1, 94% in Example 2, 77% in Comparative Example 1 and 80% in Comparative Example 2. Therefore, it was obvious from the results that in Examples 1 and 2, compared to Comparative Examples 1 and 2, the color reproduction range was expanded, and as the content ratio of the violet pigment P.V.23 increased, the color reproduction range was expanded.

Figure 6:
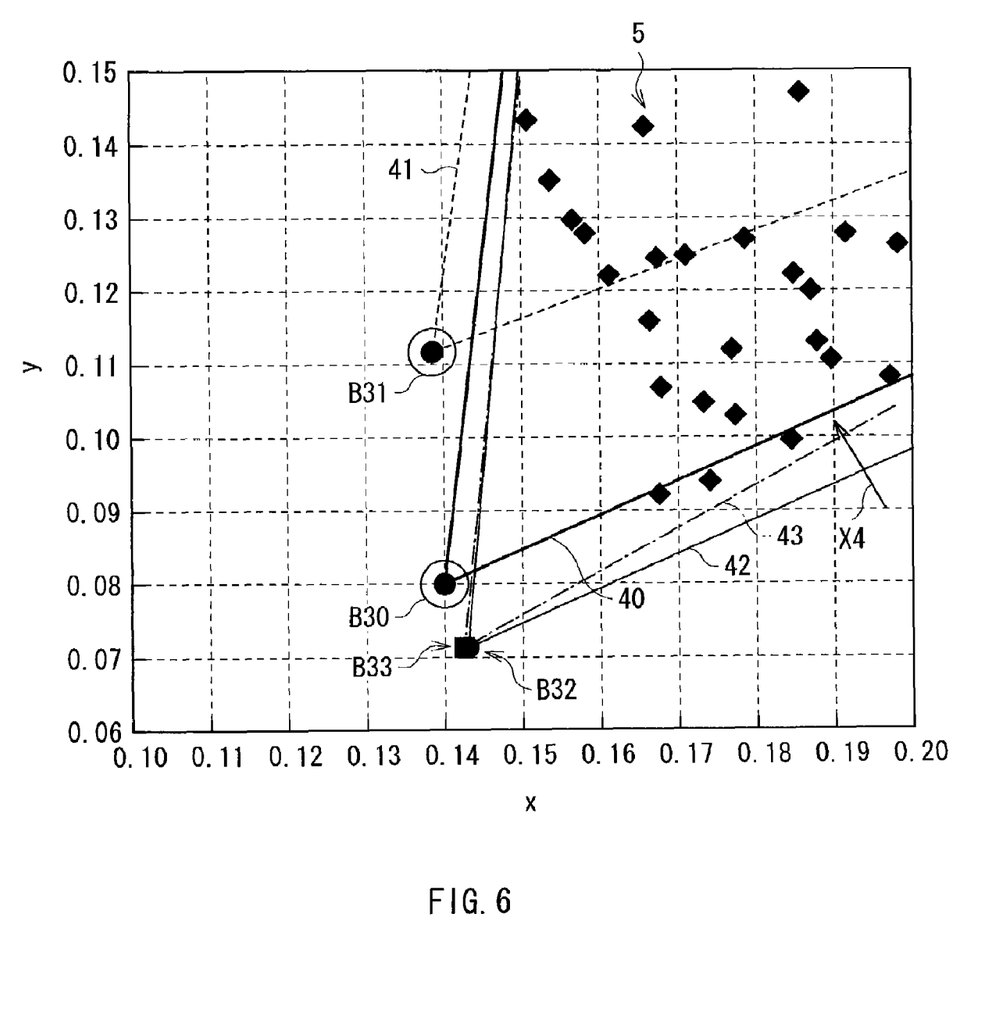
FIG. 6 is a plot of another example of the chromaticity points of blue light by a chromaticity diagram.

In FIG. 6, the color reproduction range 43 and the chromaticity point B33 of the blue display light LOb in the case where the red phosphor of the cold cathode fluorescent lamp 21 was Y$_2$O$_3$:Eu, and the above conditional expressions (4) and (5) were satisfied by the transmittance of the red color filter were added to the xy chromaticity diagram of FIG. 5. In FIG. 6, while the chromaticity point B33 of the blue display light LOb in this case was hardly changed compared to the chromaticity point B32 in Comparative Example 2, as shown by an arrow X4 in the drawing, the color reproduction range 43 in this case was reduced due to a decline in the color purity of the red display light LOr, compared to the color reproduction range 42 in Example 2. However, as the spectral characteristics of the red display light LOr (red spectral characteristics) satisfied the above conditional expressions (4) and (5), an overlap between the wavelength ranges of the green display light LOg and the red display light LOr was reduced, and as a result, it was found out that as in the case of Example 2 in which the red phosphor was YVO$_4$:Eu, the chromaticity point 5 of the object in nature could be perfectly displayed.

Although the present invention is described referring to the embodiment and the examples, the invention is not specifically limited to them, and can be variously modified. For example, in the above embodiment and the like, the structure of the liquid crystal display is specifically described; however, all layers may not be necessarily included, or another layer may be included.

Moreover, the material and the thickness of each layer, or a film formation method and film formation conditions are not specifically limited to those described in the above embodiments and the like, and each layer may be made of any other material with any other thickness, and any other film formation method and any other film formation condition may be used.

Moreover, in the above embodiment and the like, the case where the transmittance is adjusted by the materials of the blue color filter or the red color filter so as to satisfy the above conditional expressions (1) through (3) or the above conditional expressions (4) and (5) is described; however, the transmittance may be adjusted by the film thickness or the like of the blue color filter or the red color filter. Further, an adjustment layer (for example, a diffusing plate, a ND (Neutral Density) filter or the like) adjusting the spectral characteristics (transmittance) of the display light LO may be disposed, for example, between the lighting system 2 and the liquid crystal panel 3 or in the liquid crystal panel 3 to satisfy the conditional expressions (1) through (3) or the conditional expressions (4) and (5). In such a structure, the same effects as those in the above embodiment and the like can be obtained.

In the above embodiment and the like, an active matrix type liquid crystal display is described; however, the present invention can be applied to a passive matrix type liquid crystal display.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display, comprising:
    a cold cathode fluorescent lamp including a red phosphor, a green phosphor and a blue phosphor and emitting white light, the green phosphor including $BaMgAl_{10}O_{17}$:Eu, Mn and the blue phosphor including $BaMgAl_{10}O_{17}$:Eu; and
    a liquid crystal panel modulating the white light according to an image signal to emit the modulated white light as a display light,
    wherein assuming that the maximum peak intensity is Pbmax, the peak intensity at a wavelength of 506 nm is Pb(506 nm), the peak intensity at a wavelength of 530 nm is Pb(530 nm), and the peak intensity at a wavelength of 550 nm is Pb(550 nm), in blue spectral characteristics of the display light, Pbmax, Pb(506 nm), Pb(530 nm) and Pb(550 nm) satisfy the following conditional expressions (1) through (3):

$$Pb(506\ nm)/Pb\text{max} \leq 0.550 \quad (1)$$

$$Pb(530\ nm)/Pb\text{max} \leq 0.100 \quad (2)$$

$$Pb(550\ nm)/Pb\text{max} \leq 0.025 \quad (3).$$

2. The liquid crystal display according to claim 1, wherein the liquid crystal panel includes a blue color filter selectively allowing only light in a blue wavelength range of the white light modulated according to the image signal to pass through, and
    the blue color filter is formed so as to satisfy the conditional expressions (1) through (3).

3. The liquid crystal display according to claim 2, wherein the blue color filter includes Pigment Blue (P.B. 15:6) as a blue pigment and Pigment Violet (P.V.23) as a violet pigment, and
    the content ratio between Pigment Blue (P.B. 15:6) and Pigment Violet (P.V.23) is within a range from 3:7 to 4:6.

4. The liquid crystal display according to claim 2, wherein the thickness of the blue color filter is adjusted so as to satisfy the conditional expressions (1) through (3).

5. The liquid crystal display according to claim 1, further comprising:
    an adjustment layer between the cold cathode fluorescent lamp and the liquid crystal panel or in the liquid crystal panel so as to adjust the spectral characteristics of the white light and guide the adjusted white light to the liquid crystal panel,
    wherein the adjustment layer is formed so as to satisfy the conditional expressions (1) through (3).

6. The liquid crystal display according to claim 5, wherein the adjustment layer is a diffusing plate, the transmittance of the diffusing plate being adjusted so as to satisfy the conditional expressions (1) through (3).

7. The liquid crystal display according to claim 1, wherein the red phosphor includes $YVO_4$:Eu or $Y(P,V)O_4$:Eu.

8. The liquid crystal display according to claim 1, wherein the red phosphor includes $Y_2O_3$:Eu, and
    assuming that the maximum peak intensity is Prmax, the peak intensity at a wavelength of 580 nm is Pr(580 nm), and the peak intensity at a wavelength of 600 nm is Pr(600 nm), in the red spectral characteristics of the display light, Prmax, Pr(580 nm) and Pr(600 nm) satisfy the following conditional expressions (4) and (5):

$$Pr(580\ nm)/Pr\text{max} \leq 0.200 \quad (4)$$

$$Pr(600\ nm)/Pr\text{max} \leq 0.850 \quad (5).$$

9. The liquid crystal display according to claim 8, wherein the liquid crystal panel includes a red color filter selectively allowing only light in a red wavelength range of the white light modulated according to the image signal to pass through, and
    the red color filter is formed so as to satisfy the conditional expressions (4) and (5).

* * * * *